3,024,145
PROCESS OF BONDING GLASS ARTICLES
Ralph F. Nickerson, West Springfield, Mass., assignor to Monsanto Chemical Company, St. Louis, Mo., a corporation of Delaware
No Drawing. Filed May 1, 1957, Ser. No. 656,211
11 Claims. (Cl. 154—43)

The present invention relates to a process of binding a glass material to another glass material.

The prior art has suggested the application of silica aquasols to glass materials followed by drying to form a silica coating. However, a silica coating formed in this manner is discontinuous, it shatters readily and has poor adhesion to glass. For these reasons it has not been possible to use silica aquasols per se for binding a glass material to another glass material in a satisfactory manner.

It is one object of this invention to provide a process of binding a glass material to another glass material by the use of a modified silica sol to form a composite glass material having an adherent silica containing binder.

It is a further object of this invention to provide a process of binding glass fibers to other glass fibers by an adherent silica containing binder.

It is a further object of this invention to provide a process of binding a glass material to another glass material, whereby the sole binding agent consists of substantially pure silica.

It is a further object of this invention to provide a process of binding glass fibers to other glass fibers whereby the binder consists of substantially pure silica.

Still further objects and advantages of this invention will be apparent from the following description and the appended claims.

The process of this invention is carried out, in general, by applying a coating of a silica aquasol containing water-soluble, non-ionic, film-forming organic polymer to at least one glass material and either concurrently therewith or subsequently bringing another glass material into contact with the coated glass material and drying the coating while maintaining contact between the glass materials and the coating. The glass material which is joined or bound to the coated glass material by this process may be uncoated or coated with a similar or identical coating of the silica aquasol. If the presence of the organic polymer in the binder is objectionable for the intended use of the composite glass material formed, the organic polymer may be removed by heating the composite glass material to a temperature at least equal to the thermal decomposition temperature of the organic polymer, but below the melting temperature of the glass material. The temperature used may be above the softening temperature of the glass material provided the deformation of the glass material due to softening is not objectionable or provided the glass material may be retained in its original form while it is in a softened state.

The process of this invention may be used to bind a glass plate to another glass plate or to bind a glass fabric to another glass fabric. In such instance the fabric may be woven or unwoven. The process may also be used to bind glass fibers to each other to form an unwoven mat or bat of random or parallel arranged fibers, for example, an insulating bat of glass fibers. The particular glass composition used may be of any of the conventional types used in plate glass, window pane glass, chemical apparatus glass, glass fabrics or glass fibers. However, the surface of the glass material should be clean, that is substantially free of oils, waxes or other substances which prevent adhesion of the silica containing coating.

The silica aquasols employed may have a pH ranging from about 2 to 10.5. For example, acidic silica aquasols prepared as described in U.S. Patent No. 2,375,738 to John F. White, issued May 8, 1945, may be used. Such acidic aquasols may be treated with cation-exchange materials to remove residual metallic cations and employed in the process of this invention. However, the acidic silica aquasols containing electrolytes cause some settling of the non-ionic polymer, and the silica aquasols having a pH of about 2 to 8 are relatively unstable, tending to gel on standing for periods of from 0.5 to 30 days even when refrigerated. Accordingly, it is preferred to use alkaline silica aquasols having a pH above 8.0, particularly in the pH range of about 8.5 to 10.5, and a $SiO_2$ to $M_2O$ ratio in excess of 10:1, particularly a ratio of 50:1 to 200:1, where M is a monovalent alkali cation. The preferred silica aquasols have an average colloidal silica particle size below 200 millimicrons and generally within the range of 5 to 175 millimicrons. The alkaline silica aquasols may be prepared by the procedures described in U.S. Patent No. 2,375,738 to John F. White, issued May 8, 1945; U.S. Patent No. 2,244,325 to Paul G. Bird, issued June 3, 1941; U.S. Patent No. 2,572,578 to Henry S. Trail, issued October 23, 1951; and U.S. Patent No. 2,515,949 to Vincent Di Maio, issued July 18, 1950. The first three mentioned patents describe processes suitable for the preparation of the preferred silica aquasols containing less than 0.25% by weight of electrolyte, based on a sol containing 30% by weight of $SiO_2$. However, the process of the Di Maio patent usually provides a silica aquasol having larger amounts of electrolyte on an equivalent $SiO_2$ basis and such aquasol is not as suitable for the purposes of this invention as those containing smaller amounts of electrolyte.

The non-ionic, film-forming organic polymer employed in this invention may be any of a large variety of water-soluble, non-ionic, film-forming natural polymer such as polysaccharides having such properties, as, for example, starches and dextrins. Modified water-soluble natural polymers such as methyl cellulose may also be used. Synthetic non-ionic organic polymers such as the water-soluble polyvinyl alcohols, polyglycerols, partially-hydrolyzed polyvinyl acetate and the like may also be used. The preferred polymers are those which consist of carbon, hydrogen and oxygen atoms and which have an aliphatic chain of at least three carbon atoms linked by carbon to carbon bonds. It is particularly desirable to use polymers which have a molecular weight above 1000 and preferably above 2000. Best results are obtained when such polymers have a molecular weight in the range of 5000 to 100,000. The preferred species of polymer is a water-soluble polyvinyl alcohol.

The term "water-soluble" polymer as used herein is intended to mean polymers of the type described in the preceding paragraph which are soluble in water at room temperature, for example, at 15–30° C., to the extent of at least 5% by weight, and preferably from 5 to 25% by weight.

The coating solution which is applied to the glass materials may contain varying amounts of colloidal silica depending on the thickness of coating applied, the nature of the glass materials which are to be bonded together and the strength of bond desired. In general, sufficient colloidal silica should be present to create a silica bond between the glass surfaces but the upper limit is not important except from the standpoint of economy. In most instances a concentration of colloidal silica in the range of about 1 to 35% by weight is suitable, but it is preferred for most purposes to use a coating solution containing about 5 to 15% by weight of colloidal silica. The amount of the organic polymer employed in the coating solution may also be varied, but, desirably, should be the minimum necessary for providing, with the colloidal silica, a good bond of the glass material to another glass material. Large amounts of the organic polymer not only are uneconomical to use but also tend to creat viscosity and flow problems and thus may make application of the solution to the glass material difficult. Also, a problem is sometimes created in removing such polymer after the binder has dried. In general, the organic polymer is employed in amounts of about 5 to 100% by weight, based on the weight of $SiO_2$, but the lower percentage is primarily applicable when polyvinyl alcohol or partially hydrolyzed polyvinyl acetates are used, and it is generally necessary to use larger amounts of other organic polymers, for example, minimum amounts of at least 15% by weight, based on the $SiO_2$ when starches are employed. In the case of polyvinyl alcohol or partially hydrolyzed polyvinyl acetate, it is desirable to use from about 5 to 25% by weight, based on the $SiO_2$, but it is preferred to employ from about 6 to 10% by weight, based on the $SiO_2$.

The aqueous coating solution may be prepared in various ways, for example, by dissolving the organic polymer in the silica aquasol or by preparing a solution thereof in water and then admixing the solution with an appropriate amount of silica aquasol. The latter procedure is preferred since it generally gives the more stable coating solutions. Such coating solutions may contain other additives providing they do not interfere with the binding action of the silica and organic polymer ingredients or they do not interfere with the subsequent removal of the organic polymer when a substantially pure $SiO_2$ binder is desired. A suitable additive material which may be used when the organic polymer is to be removed subsequently by heat is a heat volatile oxidizing agent such as ammonium nitrate which assists in oxidation of the organic polymer without leaving an electrolyte residue.

The coating solutions may be applied to the glass material in various ways as, for example, by spraying, dipping or immersing, casting or coating or the like, depending primarily on the shape and size of the glass material used. The mode of application of the coating solution for use in forming glass fiber bats or mats is usually accomplished most efficiently by spraying or immersing a preformed glass fiber mat or bat free of binder with or in the coating solution applying about 3 to 10% by weight of colloidal silica, on the weight of the dry glass fibers. The organic polymer is thus simultaneously applied in the percentages hereinbefore given. The mat or bat is then dried to form a strong unitary structure from which the fibers are not readily dislodged. The organic polymer may be left in the mat or bat or may be removed when its presence is objectionable by heating the mat or bat above the decomposition temperature of the polymer but below the softening temperature of the glass fibers.

A further understanding of the process of this invention will be obtained from the following examples which are intended to illustrate the invention but not to restrict the invention, parts and percentages being by weight unless otherwise specified.

*Example I*

Fifteen parts of polyvinylalcohol (Elvanol 70–05) were dissolved in 185 parts of water at room temperature and the resulting solution was stirred into 400 parts of a silica aquasol having an $SiO_2$ content of about 15%, a pH of about 9.5, an $SiO_2$ to $Na_2O$ ratio of about 150:1, an average particle size of about 150 millimicrons and a sodium chloride content of about 0.04%. The coating solution thus obtained was cast on a glass plate in the form of a continuous coating about 0.005 millimeter thick. Another glass plate was applied on top of the wet coating and the composite of two glass plates was heated at a temperature of 200° F. until the coating was dry. The glass plates adhered to each other very firmly and could not be separated by hand.

The glass plates were heated slowly to a temperature of 300° C. over a period of two hours and then were heated slowly to a temperature of 500° C., which was below the softening point of the glass, until all of the polyvinyl alcohol and its decomposition products were removed from the binder coating. The binder coating thus consisted of substantially pure silica, but the adhesion of the binder coating to the glass plates was not appreciably impaired, and the glass plates still adhered to each other tenaciously and could not be separated by hand.

*Example II*

The process of Example I was repeated except that the coating solution used was prepared by dissolving 4 parts of the polyvinyl alcohol in 185 parts of water and adding the resulting solution to 400 parts of the silica aquasol thus providing a coating solution containing about 10.2% of $SiO_2$, and 6.6% of polyvinyl alcohol based on the $SiO_2$. The results were comparable to those obtained in Example I. However, the coating solution did have the advantage of less foam as compared to the coating solution of Example I.

*Example III*

The process of Example I was repeated except that the coating solution used was prepared by dissolving 2 parts of water-soluble methyl cellulose (Methocel) in 50 parts of water and then stirring the resulting solution into 100 parts of a silica aquasol containing 30% of $SiO_2$ but otherwise having the same physical properties as the silica aquasol described in Example I. The results obtained were comparable to those obtained in Example I. However, the methyl cellulose caused some settling of the colloidal silica requiring periodic agitation to produce a uniform solution, probably due to the presence of sodium chloride or other electrolytes in the methyl cellulose. For this reason, commercial methyl cellulose is not as suitable as a commercial polyvinyl alcohol which is substantially free of electrolytes.

*Example IV*

Example I was repeated except that the coating solution used was prepared by dissolving 8 parts of water-soluble starch in 50 parts of water and then stirring with 100 parts of a silica aquasol containing 30% of $SiO_2$ but otherwise having the same physical properties as the silica aquasol of Example I. The results were comparable to those obtained in Example I. However, starch could not be successfully used at the low concentration employed for polyvinyl alcohol and methyl cellulose in Examples II and III, and therefore is not equivalent to these materials.

*Example V*

Example I was repeated except that the coating solution used was a mixture of the coating solutions employed in Examples II and III. The results were comparable to those obtained in Example I.

*Example VI*

Nine parts of water-soluble polyvinyl alcohol (Elvanol 70–05) were mixed with 30 parts of cold water (about 15° C.) and then heated with stirring until a clear viscous solution was obtained. This was then added to 452 parts of a silica aquasol having an $SiO_2$ content of 30%, a pH of about 9.5, an $SiO_2$ to $Na_2O$ ratio of about 150:1, an average particle size of about 150 millimicrons and a sodium chloride content of about 0.11%. The resulting coating solution was then used to bind glass fibers in a bat of randomly arranged glass fibers. This was accomplished by immersing the glass fiber bat (which was free of binder) in the coating solution, removing the bat from the solution and allowing excess solution to drain off and then drying the bat at a temperature of about 250° F. There was thus obtained a unitary glass fiber bat in which the individual glass fibers were bonded to each other by a film of colloidal silica and polyvinyl alcohols. The adhesion between the glass fibers was excellent and it was difficult to separate the adhering glass fibers by hand.

In those instances, where the sensitivity of the glass fiber bat to moisture is not of importance from an insulation standpoint, the bat may be used for insulating purposes without removal of the polyvinyl alcohol from the binder. However, where the sensitivity of the organic polymer to water was objectionable for insulation purposes, the organic polymer was removed by heating the treated glass fiber bat at a temperature of about 400° C. until the polyvinyl alcohol and its decomposition products were no longer present in the binder. The resulting glass fiber bat retained its properties even though the binder consisted of substantially pure silica. This bat was not sensitive to moisture and was useful as an insulation bat where moisture sensitivity would be considered objectionable as, for example, in refrigerator cabinets or deep freeze cabinets or the like.

When clear glass plates are bonded together using the process described in Examples I through V, the composite glass plate may have an appearance ranging from a hazy transparency to opaque depending primarily on the amount of coating solution applied, the concentration of colloidal silica and organic polymer used. Normally, silica aquasols having a higher average particle size tend to impart opacity and this is also true when starch is employed. On the other hand, the use of organic polymers such as polyvinyl alcohol and methyl cellulose tend to give clear films, and transparent or hazy transparent films are also favored by the use of silica aquasols having an average particle size between about 5 and 40 millimicrons. Thus, by judicious selection of silica aquasol and organic binder, it is possible to obtain composite glass plate articles which have a hazy transparency, or are translucent but not transparent, or are opaque.

The temperature and time required to remove the organic polymer from the colloidal silica binder by heating will vary to some extent depending on the nature of the composite article obtained. For example, if the article is a composite glass plate with a film of the colloidal silica and organic polymer sandwiched between two glass plates it is more difficult to remove the organic polymer because of the difficulty of obtaining complete oxidation due to the limited oxygen available. Hence, it is usually necessary to employ relatively low temperatures initially and finally higher temperatures and longer heating periods for removing the organic polymer in such instances. In those instances where a considerable surface of the binder is exposed to the atmosphere, as in the case of coated glass fiber mats or bats, the organic polymer is more readily removed from the binder at lower temperatures at moderate heating periods or in short periods of time, at higher temperatures. Ordinarily temperatures of about 350 to 650° C. may be used and heating periods of about 1 to 180 minutes with the longer period corressponding to the lower temperatures.

This application is a continuation-in-part of my copending application Serial No. 488,419, filed February 15, 1955, now abandoned.

What is claimed:

1. A process of bonding the glass fibers in a glass fiber insulation bat which comprises applying a film of a silica aquasol having a pH of about 8.5 to 10.5 and an $SiO_2$ to $M_2O$ ratio of 50:1 to 200:1, wherein M is a monovalent alkali cation, said aquasol being further characterized in that it contains average colloidal silica particles of a size within the range of 5 to 175 millimicrons and from about 5 to 100% by weight, based on the $SiO_2$ in said aquasol, of a water-soluble, non-ionic, film-forming organic polymer having a molecular weight between 5000 and 100,000 and consisting of carbon, hydrogen and oxygen atoms with the further proviso that it is soluble in water at a temperature of 15 to 30° C. to the extent of at least 5% by weight and contains an aliphatic carbon chain of at least three carbon atoms linked by carbon to carbon bonds, between adjacent fibers of said bat, subsequently drying said film while maintaining said fibers in contact with the film between them and adjacent fibers and subsequently heating said film at a temperature sufficiet to remove said organic polymer and its heat decomposition products but below the softening point of said fibers, whereby said glass fibers are bonded together by a binder composed of substantially pure silica.

2. A process as in claim 1, but further characterized in that said organic polymer is a water-soluble polyvinyl alcohol.

3. A process as in claim 1, but further characterized in that said organic polymer is a water-soluble methyl cellulose.

4. A process as in claim 1, but further characterized in that said organic polymer is a water-soluble starch and the concentration thereof is about 15 to 100% by weight, based on the $SiO_2$ in the aquasol.

5. A process as in claim 1, but further characterized in that said organic polymer is a water-soluble dextrin.

6. A process of bonding at least two separate glass articles which comprises disposing between adjacent surfaces of such glass articles a film of an alkaline silica aquasol having a pH above 8 and up to 10.5 and an $SiO_2$ to $M_2O$ ratio in excess of 10:1, where M is a monovalent alkali cation, and containing (1) average colloidal silica particles of a size within the range of 5 to 175 millimicrons and (2) about 5 to 100% by weight, based on the weight of $SiO_2$ in said aquasol, of a water-soluble, non-ionic, film-forming organic polymer having a molecular weight above 1000 and being soluble in water at a temperature of 15 to 30 C. to the extent of at least 5% by weight, subsequently heating said film while said surfaces are maintained in contact with said film and until said film is substantially dry and subsequently heating said film to a temperature for a period of time sufficient to remove said organic polymer and its heat decomposition products, but below the temperature at which melting of the glass surfaces occurs.

7. A process as in claim 6, but further characterized in that said organic polymer is a water-soluble polyvinyl alcohol.

8. A composite glass article comprising at least two glass articles having adjacent surfaces thereof which are bonded together by a film of substantially pure silica which film is adherent to the glass surface of each of said glass articles, and said composite glass article having been produced by the process of claim 6.

9. A process of bonding glass fibers in a glass fiber bat or felt which comprises disposing between adjacent fibers of said bat or felt a film of an alkaline silica aquasol having a pH of about 8.5 to 10.5 and an $SiO_2$ to $M_2O$ ratio in excess of 10:1, where M is a monovalent alkali cation, and containing (1) average colloidal silica particles of a size within the range of 5 to 175 millimicrons and (2) about 5 to 100% by weight, based on the weight of $SiO_2$ in said aquasol, of a water-soluble, non-ionic, film-forming organic polymer having a molecular weight above 2000 and being soluble in water at a temperature of 15 to 30° C. to the extent of at least 5% by weight, subsequently drying said film while maintaining said adjacent glass fibers in contact with said film and subsequently heating said film at a temperature and for a period of time sufficient to remove said organic polymer and its heat decomposition products but below the softening point of said glass fibers.

10. A process as in claim 9, but further characterized in that said organic polymer is a water-soluble polyvinyl alcohol.

11. A glass fiber bat comprising glass fibers which are bonded to adjacent glass fibers by a film of substantially pure silica which film is adherent to the surface of the glass fiber in contact therewith and also being adherent to the surface of an adjacent glass fiber in contact therewith, said glass fiber bat having been produced by the process of claim 9.

References Cited in the file of this patent

UNITED STATES PATENTS

| 2,076,078 | French | Apr. 6, 1937 |
|---|---|---|
| 2,350,161 | Gloor | May 30, 1944 |
| 2,383,653 | Kirk | Aug. 28, 1945 |
| 2,413,570 | Krister | Dec. 31, 1946 |
| 2,456,251 | Boughton et al. | Dec. 14, 1948 |
| 2,492,498 | Pedersen | Dec. 27, 1949 |
| 2,530,983 | Minter | Nov. 21, 1950 |
| 2,597,872 | Iler | May 27, 1952 |
| 2,601,352 | Wolter | June 24, 1952 |
| 2,788,052 | Schulman | Apr. 9, 1957 |
| 2,791,262 | Budnick | May 7, 1957 |
| 2,833,661 | Iler | May 6, 1958 |
| 2,902,459 | Teppema | Sept. 1, 1959 |

FOREIGN PATENTS

| 524,904 | Belgium | June 9, 1954 |